United States Patent [19]
Lemon et al.

[11] Patent Number: 5,702,598
[45] Date of Patent: Dec. 30, 1997

[54] MAGNETIC FILTER

[76] Inventors: John Lemon, 79 5th Ave., Maple Shade, N.J. 08052; Kenneth Walthall, 1900 Share Crest, Arlington, Tex. 76020

[21] Appl. No.: 716,067

[22] Filed: Sep. 19, 1996

[51] Int. Cl.⁶ ..................................................... B01D 35/06
[52] U.S. Cl. .......................... 210/223; 210/303; 335/285
[58] Field of Search ............................ 210/222, 223, 210/303; 335/285

[56] References Cited

U.S. PATENT DOCUMENTS

| | | | |
|---|---|---|---|
| 3,480,145 | 11/1969 | Gladden | 210/223 |
| 5,089,129 | 2/1992 | Brigman | 210/223 |
| 5,468,381 | 11/1995 | Williamson | 210/223 |
| 5,571,411 | 11/1996 | Butler et al. | 210/223 |

*Primary Examiner*—David A. Reifsnyder
*Attorney, Agent, or Firm*—Brady, O'Boyle & Gates

[57] ABSTRACT

A magnetic filter for an oil filter canister used on a vehicle and an oil pan on a vehicle transmission for attracting magnetic particles contained in the oil. The magnetic filter includes a magnet contained in a shallow cup having a suction cup for securing the magnetic filter in the operative position on the filter canister and oil pan.

4 Claims, 2 Drawing Sheets

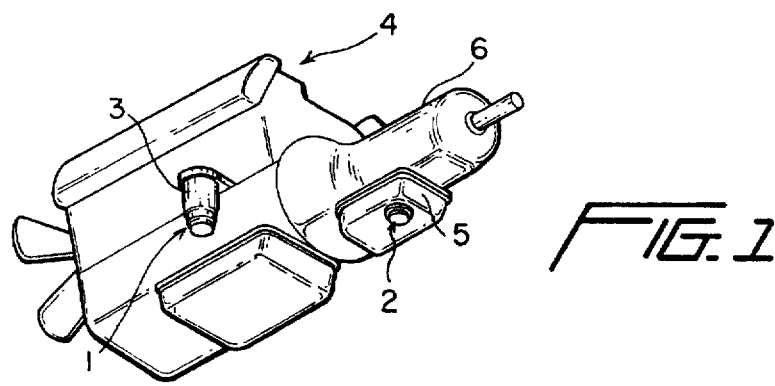
FIG. 1
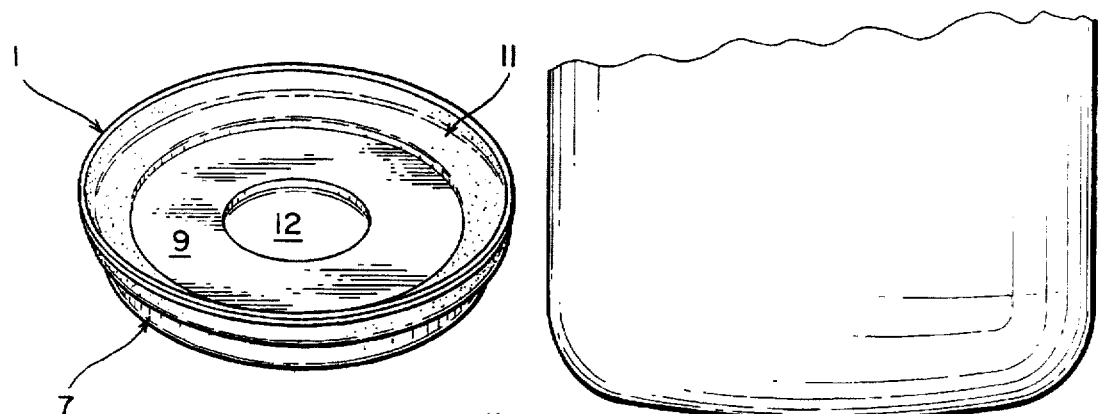
FIG. 2
FIG. 4
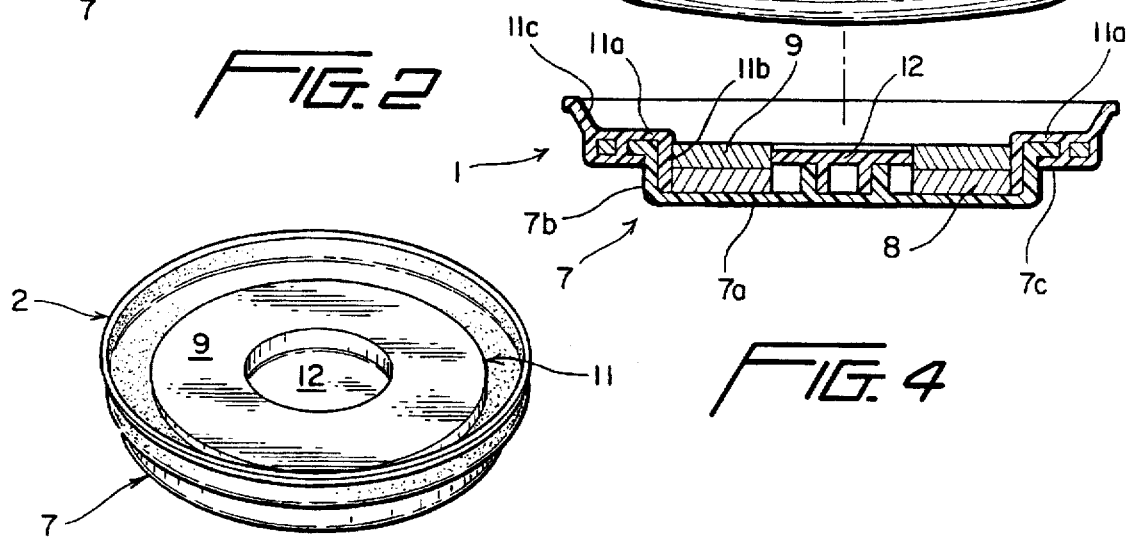
FIG. 3

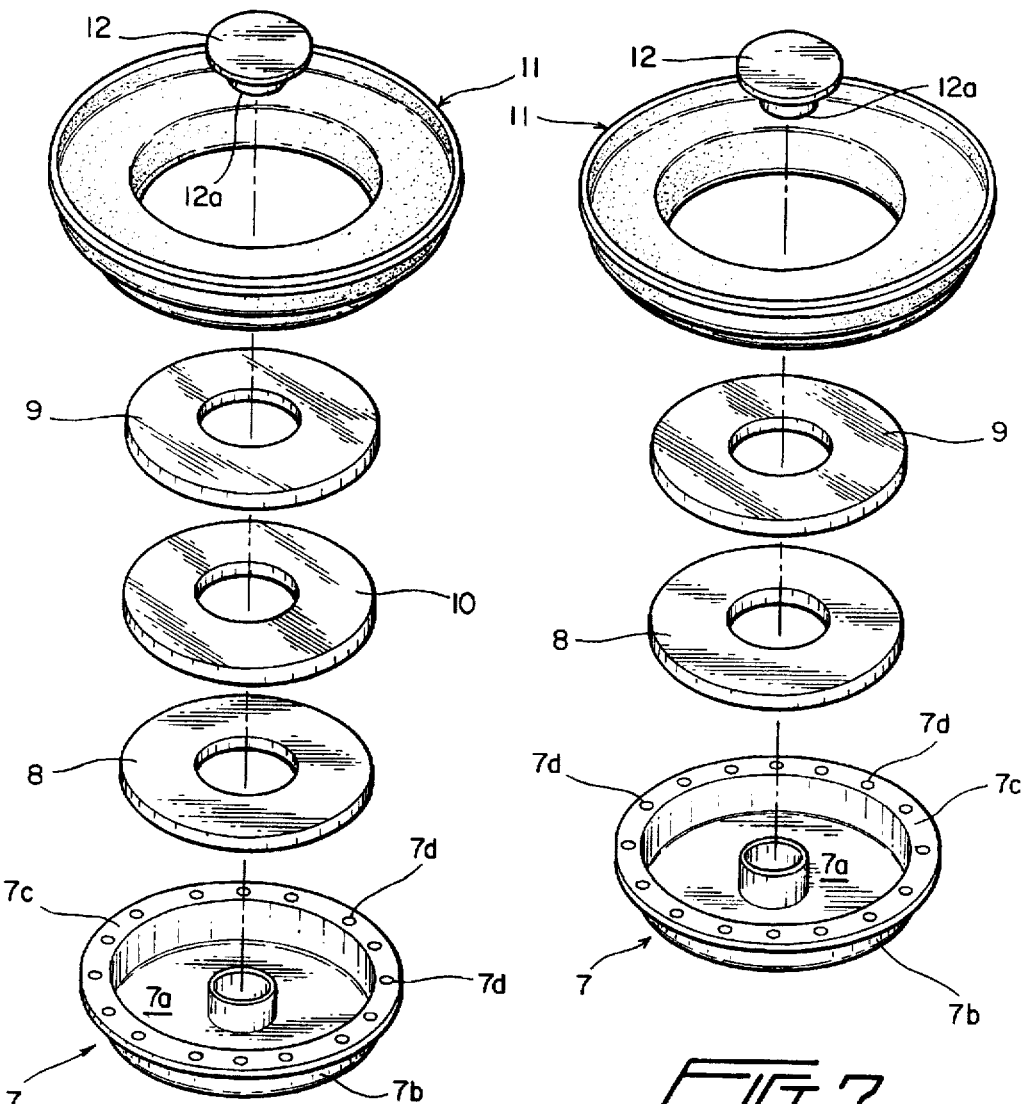

MAGNETIC FILTER

BACKGROUND OF THE INVENTION

Magnetic filters have been proposed for attaching to oil filter canisters used on vehicle internal combustion engines for attracting magnetic particles contained in the lubricating oil flowing through the oil filter to thereby prevent the discharge of the magnetic material with the filtered oil. The magnetic filter includes a cup containing a magnet which is slip fit onto the lower end portion of the oil filter canister.

While these magnetic filters have been generally satisfactory for their intended purpose, they have been characterized by certain disadvantages in that the magnetic force of the magnet is not only employed for attracting magnetic particles contained in the lubricating oil, but also for holding the cup on the filter canister resulting in the magnetic filter eventually falling off the oil filter canister. Furthermore, the heretofore employed magnetic filters have been constructed and arranged to be attached only to an oil filter canister and not to other housings on the internal combustion engine containing fluid, such as the transmission housing.

To overcome the disadvantages experienced in heretofore employed magnetic filters, the magnetic filter of the present invention has been devised which can be attached to either an oil filter canister or a transmission housing, and includes a suction cup seal for holding the magnetic filter on the oil filter canister and transmission housing.

SUMMARY OF THE INVENTION

The magnetic filter of the present invention comprises a shallow plastic cup having a bottom wall and an integral side wall with an outwardly extending flange integral with the upper peripheral edge of the side wall. A rubber suction cup is connected to the cup flange, and an annular magnet is supported on the bottom wall of the cup. A button is positioned in the center of the annular magnet to maintain the magnet centered in the cup. By this construction and arrangement, the suction cup not only holds the magnetic filter on the oil filter housing or transmission housing, but also it functions as a seal to prevent dust and dirt from entering the cup. While the suction cup provides the primary holding force for the magnetic filter, this holding force will also be augmented by the magnetic force of the magnet contained in the cup.

BRIEF DESCRIPTION OF THE DRAWINGS

FIG. 1 is a perspective view of the magnetic filter of the present invention mounted on an engine oil filter canister and oil pan of a transmission;

FIG. 2 is a perspective view of the magnetic filter of the present invention for use on the oil filter canister;

FIG. 3 is a perspective view of the magnetic filter of the present invention for use on transmission oil pans;

FIG. 4 is a sectional side elevational view of the magnetic filter shown in FIG. 2;

FIG. 5 is an exploded view of the magnetic filter shown in FIG. 3;

FIG. 6 is a sectional side elevational view of the magnetic filter shown in FIG. 3 mounted on the transmission oil pan;

FIG. 7 is an exploded view of the magnetic filter shown in FIG. 2; and

FIG. 8 is a sectional side elevational view of the magnetic filter shown in FIG. 4 mounted on an oil filter canister.

DESCRIPTION OF THE PREFERRED EMBODIMENTS

Referring to the drawings and, more particularly to FIGS. 1, 2, and 3, the magnetic filters 1 and 2 of the present invention are adapted to be attached, respectively, to an oil filter canister 3 used on a vehicle internal combustion engine 4, and the oil pan 5 of the engine transmission 6. Each magnetic filter 1 and 2 comprises a shallow plastic cup 7 having a bottom wall 7a, an integral side wall 7b, and an outwardly extending flange 7c integral with the upper peripheral edge of the side wall 7b.

An annular ring 8 is supported on the bottom wall 7a, and, in the magnetic filter 1 shown in FIG. 4, an annular magnetic disc 9 is supported by the annular ring 8, whereas, in the magnetic filter 2 shown in FIG. 6, an additional annular ring 10 is interposed in the ring 8 and magnet 9. In both instances, the magnetic disc 9 is substantially co-planar with this outwardly extending flange 7c of the cup 7.

A rubber sealing suction cup 11 is connected to the cup 7 and comprises a radially extending portion 11a connected to the cup flange 7c, a depending skirt portion 11b integral with the inner end of the radially extending portion 11a, and a radially outwardly and upwardly extending resilient lip portion 11c integral with the outer end of the radially extending portion 11a. As will be seen in FIGS. 5 and 7, the cup flange 7c is provided with a plurality of circumferentially spaced apertures 7d through which the rubber of portion 11a flows during vulcanization, whereby the suction cup 11 is bonded to the cup 7.

A button 12 is positioned in the center of the annular magnet 9 (FIG. 4) and spacer ring 10 (FIG. 6) to maintain the components centered in the cup 7. The button 12 includes an integral depending stud 12a insertable into an upwardly extending boss 7e integral with the cup bottom wall 7a.

All of the components of the magnetic filter are held in the assembled position by a suitable adhesive.

If the magnetic filter 1 is to be used on an oil filter canister 3 as shown in FIG. 8, only the spacer ring 8 is employed to position the annular magnet 9 slightly below the radial portion 11a of the suction cup 11, to thereby accommodate the curved portion 3a on the bottom of the oil filter canister 3, whereas, if the magnetic filter 2 is to be mounted on a flat surface 5a of the oil pan 5, as shown in FIG. 6, the additional spacer 10 is employed to position the annular magnet slightly above the radial portion 11a.

In use, the magnetic filters 1 and 2 are pressed against either the bottom surface of the oil filter canister 3 or oil pad 5 to flex the resilient annular lip 11e outwardly to expel any air trapped between the suction cup 11 and bottom surface. When released, the annular lip 11c flexes inwardly creating a vacuum in the space 13 between the radial portion 11a and bottom surface.

From the above description, it will be readily apparent to those skilled in the art that the magnetic filter of the present invention is an improvement on heretofore employed magnetic filters in that the magnetic filter of the present invention is adapted to be mounted on oil filter canisters and oil pans of transmissions, and the suction cups perform a two-fold function of holding the magnetic filter in the operative position on the oil filter canister and oil pan and, also, as a seal to prevent dust and debris from entering the magnet-holding cup.

It is to be understood that the form of the invention herewith shown and described is to be taken as a preferred example of the same, and that various changes in the shape, size, and arrangement of parts may be resorted to, without departing from, the spirit of the invention or scope of the subjoined claims.

We claim:

1. A magnetic filter adapted to be selectively mounted on an oil filter canister employed in a vehicle, or on the vehicle transmission oil pan comprising a cup, said cup having a bottom wall and an integral side wall, an outwardly extending flange integral with an upper peripheral edge of the side wall, an annular disc supported on the bottom wall of said cup, an annular magnet supported on said annular disc, said annular magnet being substantially coplanar with said outwardly extending flange, means extending through said magnet and said disc for holding the magnet and disc in a centered position within said cup, and a suction cup connected to said outwardly extending flange for selectively connecting the cup and magnet to a surface of the oil filter canister or vehicle transmission pan, whereby the suction cup not only holds the magnetic filter on the surface, but also prevents dust and debris from entering the cup.

2. A magnetic filter according to claim 1, wherein the means for holding the magnet in a centered position within the cup comprises a button positioned in the center of the magnet and disc, an upwardly extending boss integral with the bottom wall of the cup, and a depending stud integral with said button, said stud inserted into said boss.

3. A magnetic filter according to claim 1, wherein said suction cup comprises a radially extending portion connected to the outwardly extending flange, a depending skirt portion integral with an inner end of the radially extending portion and extending along an inner surface of the cup side wall, and a resilient lip portion integral with an outer end of said radially extending portion, said resilient lip extending radially outwardly and upwardly from said radially extending portion.

4. A magnetic filter adapted to be selectively mounted on an oil filter canister employed in a vehicle, or on the vehicle transmission oil pan comprising a cup, having a bottom wall and an integral side wall, an outwardly extending flange integral with the upper peripheral edge of the side wall, a plurality of circumferentially spaced apertures provided in said outwardly extending flange, and a rubber suction cup having a portion thereof extending through said apertures connecting the suction cup to said outwardly extending flange, whereby the cup and magnet can be selectively connected to a surface of the oil filter canister or vehicle transmission so that the suction cup not only holds the magnetic filter on the surface, but also prevents dust and debris from entering the cup.

* * * * *